United States Patent
Uryu

(10) Patent No.: US 7,207,412 B2
(45) Date of Patent: Apr. 24, 2007

(54) MOTOR-DRIVEN POWER STEERING SYSTEM

(75) Inventor: Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/048,758

(22) Filed: Feb. 3, 2005

(65) Prior Publication Data

US 2005/0205343 A1    Sep. 22, 2005

(30) Foreign Application Priority Data

Feb. 17, 2004    (JP)    ............................... 2004-040311

(51) Int. Cl.
  *B62D 5/04*    (2006.01)
(52) U.S. Cl. ...................... 180/443; 180/446; 180/444; 701/41; 701/42; 701/43
(58) Field of Classification Search ................ 180/446, 180/443, 444; 701/41, 42, 43
  See application file for complete search history.

(56) References Cited

U.S. PATENT DOCUMENTS

| | | | |
|---|---|---|---|
| 4,092,492 A * | 5/1978 | Eachus | ........................ 375/259 |
| 5,261,501 A | 11/1993 | Tsuchiya et al. | |
| 5,889,376 A * | 3/1999 | Takatsuka et al. | .......... 318/434 |
| 5,927,430 A * | 7/1999 | Mukai et al. | ................ 180/446 |
| 6,070,692 A * | 6/2000 | Nishino et al. | ............. 180/443 |
| 6,286,621 B1* | 9/2001 | Mukai et al. | ................ 180/446 |
| 6,741,053 B2* | 5/2004 | Kifuku et al. | ............... 318/434 |
| 6,778,939 B2* | 8/2004 | Sanpei et al. | ................ 702/151 |
| 6,799,656 B2* | 10/2004 | Kimura et al. | .............. 180/446 |
| 2002/0022914 A1* | 2/2002 | Kawada et al. | ................ 701/41 |
| 2003/0121716 A1* | 7/2003 | Yamada et al. | ............. 180/446 |
| 2003/0200018 A1* | 10/2003 | Arimura | ....................... 701/41 |

FOREIGN PATENT DOCUMENTS

| | | |
|---|---|---|
| GB | 2-270-776 | 3/1994 |
| JP | B2-2678377 | 8/1997 |

* cited by examiner

Primary Examiner—Lesley D. Morris
Assistant Examiner—Marlon Arce-Diaz
(74) Attorney, Agent, or Firm—Posz Law Group, PLC

(57) ABSTRACT

A motor-driven power steering system includes a power assisting motor; a motor current sensor, a sample-hold circuit that has sampling section and a holding section, a timing signal generating circuit that generates a timing signal to activate either the sampling section or the holding section and an alarming unit that generates an abnormality signal if the timing signal is not detected for a prescribed period.

12 Claims, 4 Drawing Sheets

MOTOR-DRIVEN POWER STEERING SYSTEM

CROSS REFERENCE TO RELATED APPLICATION

The present application is based on and claims priority from Japanese Patent Application 2004-40311, filed Feb. 17, 2004, the contents of which are incorporated herein by reference.

BACKGROUND OF THE INVENTION

1. Field of the Invention

The present invention relates to a motor-driven or an electrical power steering system (hereinafter referred to as motor-driven power steering system) and, more particularly a sample-hold circuit that is controlled by an abnormality detecting function.

2. Description of the Related Art

A motor-driven power steering system for assisting operation of the steering wheel in which steering wheel operation is detected by means of steering torque to control motor rotation speed according to the steering torque is well known, as disclosed in JP-B2-2678377.

Such a motor-driven power steering system has a sample-hold circuit for detecting motor current, which has a microcomputer. The sample-hold circuit cyclically samples motor current values according to a timing signal provided by the microcomputer and holds the motor current value for a preset period.

When the current value is held by the sample-hold circuit, the current value, which is an analog signal, is converted to a digital signal by a separate A-D converter, thereby controlling operation of the motor.

Although an abnormality detecting means is equipped with, the sample-hold circuit does not correctly operate if the timing signal is not sent to the sample-hold circuit due to disconnection or breaking of a timing signal wire. For example, if a command current value is larger than a detected current value that is detected a current sensor and held by a capacitor before the disconnection or breaking, a microcomputer increases the command current value further to narrow the difference between the command current value and the detected current value because the detected current value gradually decreases as the capacitor discharges. Accordingly the motor current is excessively increased, so that power assisting is not correctly carried out.

SUMMARY OF THE INVENTION

In view of the above problem, it is an object to provide a motor-driven power steering system that has a highly reliable sample-hold circuit.

According to a feature of the invention, a motor-driven power steering system includes a power assisting motor, a current sensor that detects motor current value, a timing signal generating circuit that generates bi-level timing signals at prescribed intervals, a sample-hold circuit for sampling and holding the detected motor current value at the prescribed time intervals set by the timing signal generating circuit, an abnormality detecting circuit that makes the sample-hold circuit keep holding the last sampled value if the timing signal is not detected for a prescribed period.

In the above motor-driven power steering system, the abnormality detecting circuit may include a counter circuit connected to the timing signal generating circuit. In this case, the prescribed period is generated when the counter circuit counts a prescribed number.

The above motor-driven power steering system may include a torque sensor that detects steering torque and an assist current calculating circuit that calculates a command current value to be applied to the motor from both the current value sent from the sample-hold circuit and the steering torque sent from the torque sensor to control the motor 15. In this case, the maximum of the command current value is set to the detected motor current value if the timing signal is not detected for the prescribed period. The above described motor driven power steering system may further includes means for gradually lowering the command current value.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A motor-driven power steering system according to a preferred embodiment of the present invention will be described with reference to the appended drawings.

Figure 1:
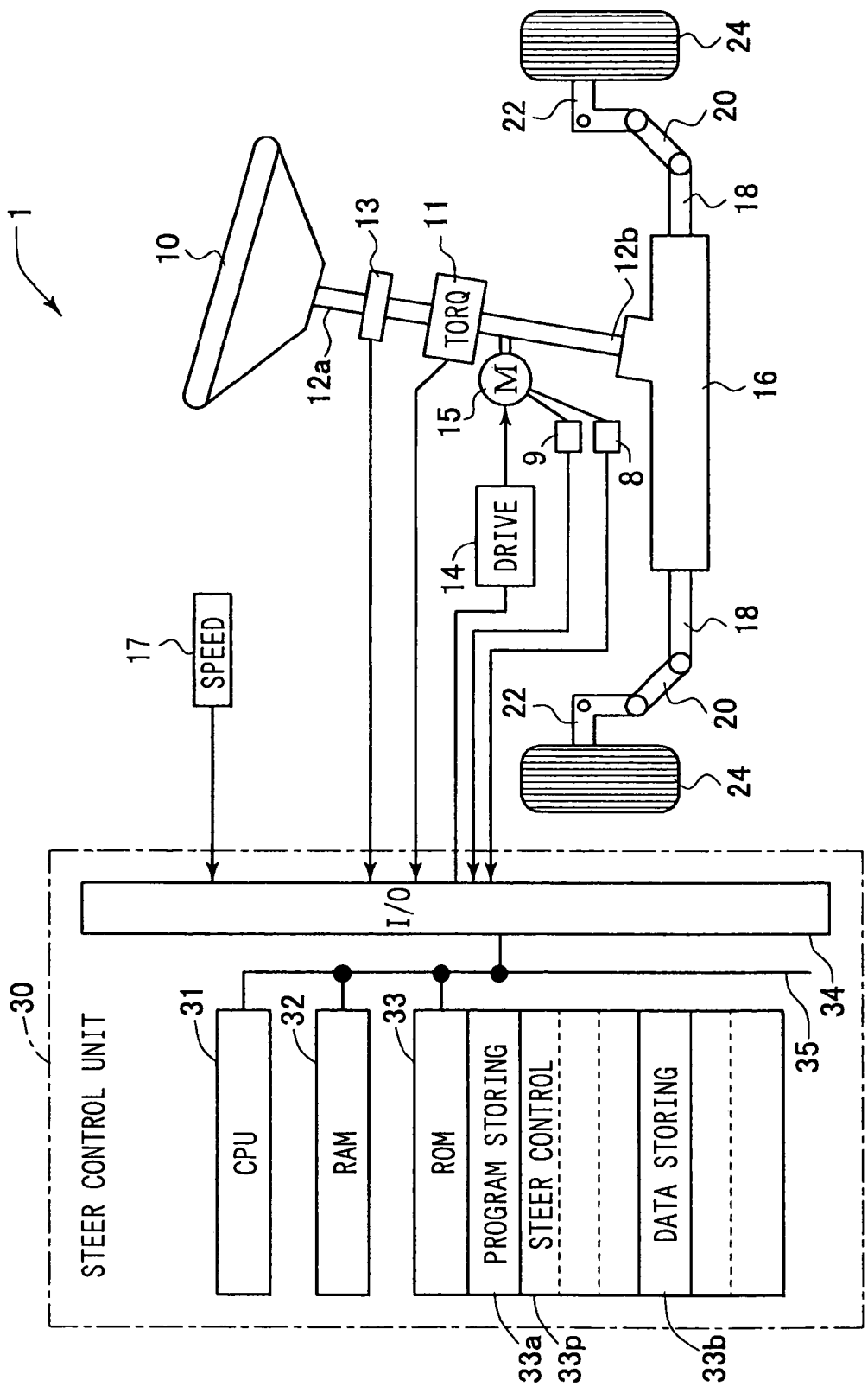
FIG. 1 is a schematic diagram illustrating an overall structure of a motor-driven power steering system according to a preferred embodiment of the invention.

As shown in FIG. 1, a steering wheel 10 is connected to a steering shaft 12a. A torque sensor 11 is connected to the lower end of the steering shaft 12a and to the upper end of a pinion shaft 12b. The pinion shaft 12b has a pinion (not shown) at the lower end thereof. The pinion is disposed in a steering gear box 16 and engages a rack bar 18. The rack bar 18 has opposite ends respectively connected to one ends of tie rods 20. The other ends of the tie rods 20 are respectively connected to steered wheels 24 via knuckle arms 22. A motor 15, such as a DC motor or a brushless motor, is also connected to the pinion shaft 12b via a gear (not shown) and driven by a motor driving circuit 14. A current sensor 8 is provided to detect motor current of the motor 15 and connected to a steer control unit 30. A vehicle speed sensor 17 is also connected to the steer control unit 30. Thus, a column type motor-driven power steering system is formed.

The torque sensor 11 includes a well-known torsion bar and a pair of resolvers that are spaced apart from each other in the axial direction of the torsion bar. When the steering wheel 10 is operated and the steering shaft 12a is turned, the torsion bar is twisted by an amount proportional to the turning. The resolver detects a difference in angle between opposite ends of the torsion bar, so that the steering torque applied to the torsion bar can be calculated from the difference in angle and the spring constant of the torsion bar. This signal is sent to the steer control unit 30.

The angular position of the motor 15 is detected by a motor angular position sensor 9, which is composed of a well-known sensor such as a rotary encoder or a resolver. The angular position sensor 9 sends its output signal to the steer control unit 30.

Figure 2:
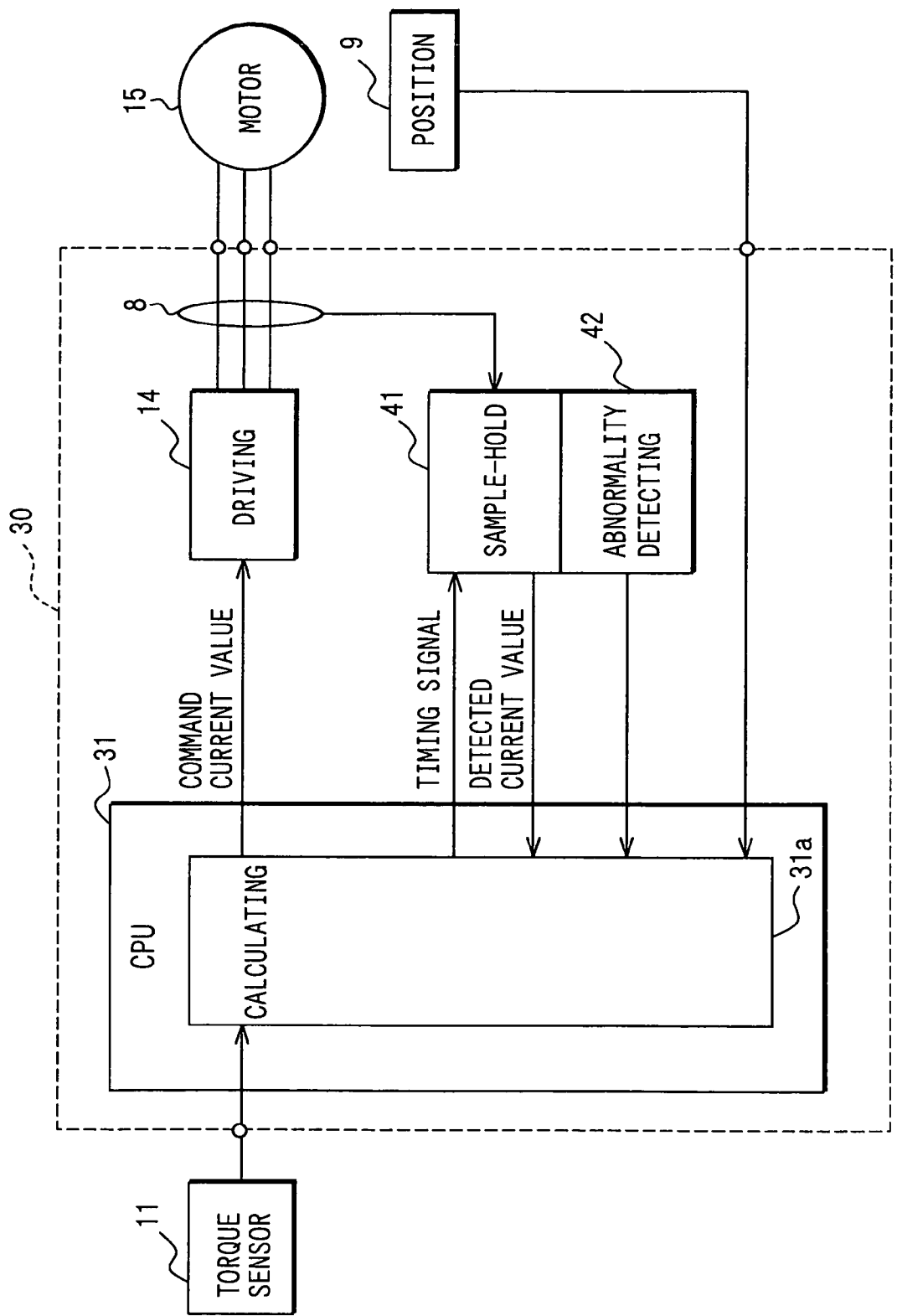
FIG. 2 is a block diagram illustrating a steer control circuit.

As shown in FIGS. 1 and 2, the steer control unit 30 includes a CPU 31, a RAM 32, a ROM 33, an input-output interface I/O 34 and their bus line 35, a sample-hold circuit 41 and an abnormality detecting circuit 42 in addition to the current sensor 8, the driving circuit 14. The CPU 31 carries out its control according to programs and data stored in the ROM 33 and RAM 32. The ROM 33 has a program storing section 33*a* and a data storing section 33*b*. The program storing section 33*a* stores a steer control program 33*p*. The data storing section 33*b* stores data necessary for carrying out the steer control program 33*p*.

The steer control unit 30 carries out the steer control program 33*p* to calculate a driving torque from the steering torque detected by the torque sensor 11, so that the motor driver 14 can apply a suitable voltage to the motor 15 to operate at a driving torque that corresponds to the steering torque. The steer control unit 30 also calculates an actual motor torque from a motor current value detected by the current sensor 8 to carry out a feedback-control so that the actual motor torque can be equal to the driving torque.

When the current sensor 8 detects motor current, the output signal of the sensor 8 is sent to a sample-hold circuit 41. The CPU 31 includes an assist current calculating section 31*a* that provides the sample-hold circuit 41 with a timing pulse signal. The timing pulse signal has pulses generated at a predetermined cycle. The sample-hold circuit 41 operates at either a sampling state or a holding state.

If the abnormality detecting circuit 42 detects an abnormality of the sample-hold circuit 41, it sends a signal to the assist current calculating section 31*a*. The assist current calculating section 31*a* calculates a command current value to be applied to the motor 15 from both the current value sent from the sample-hold circuit 41 and the steering torque sent from the torque sensor 11, and controls the driving circuit 14 with the command current value to drive the motor 15. When the system is stopped, the maximum of the command current value may be gradually lowered toward zero so that a driver or passengers do not feel a shock. Incidentally, the command current value can be calculated from the angular position signal sent from the angular position sensor 9.

Figure 3:
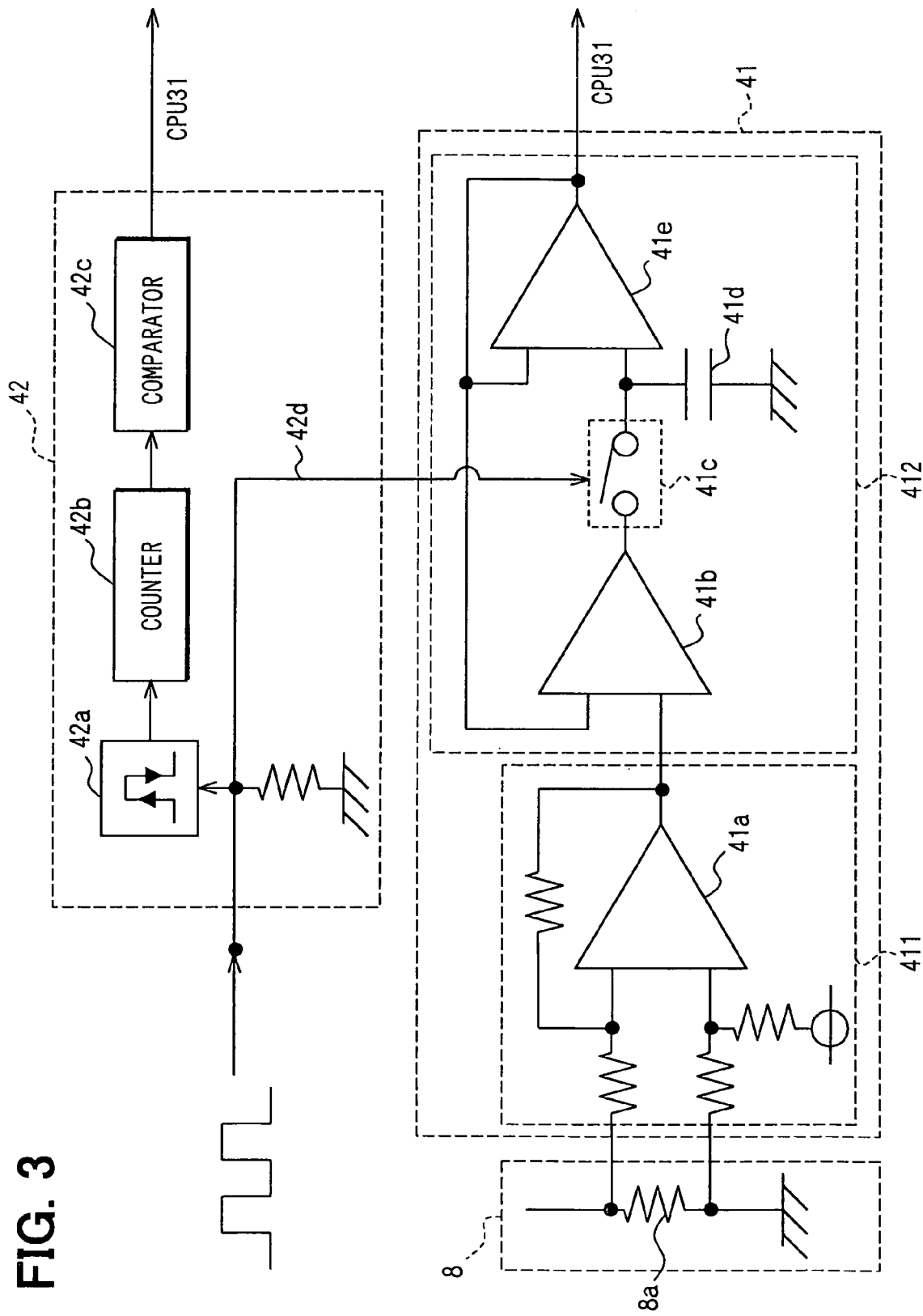
FIG. 3 is a block diagram illustrating an abnormality detecting circuit and its peripheral portions.

As shown in FIG. 3, the current sensor is composed of a shunt resistor 8*a* that provides a voltage signal when motor current is supplied to the motor 15. The sample-hold circuit 41 includes a voltage amplifying section 411 that includes a well-known operational amplifier 41*a* and a sample-hold section 412 that includes operational amplifiers 41*b*, 41*e*, a switch 41*c* and a capacitor 41*d*.

The voltage signal sent from the current sensor 8 is amplified by the voltage amplifying circuit 411 and sent to the sample-hold section 412. The sample-hold section 412 changes from one of the sampling and holding states to the other according to the timing signal sent from the CPU 31 via the abnormality detecting circuit 42.

When the timing signal provides an H-level, the switch 41*c* is turned on, so that the sample-hold section 412 stays at the sampling state. Accordingly, the capacitor 41*d* is charged until the capacitor voltage becomes as high as the output terminal of the operational amplifier 41*b*. When the timing signal provides an L-level, the switch 41*c* is turned off. Accordingly, the electric charge of the capacitor 41*d* is discharged, and the output voltage of the operational amplifier 41*e* becomes as low as the voltage of the capacitor 41*d*.

The output voltage of the operational amplifier 41*e* is sent to the assist current calculating section 31*a*, as a detected current signal.

Figure 4:
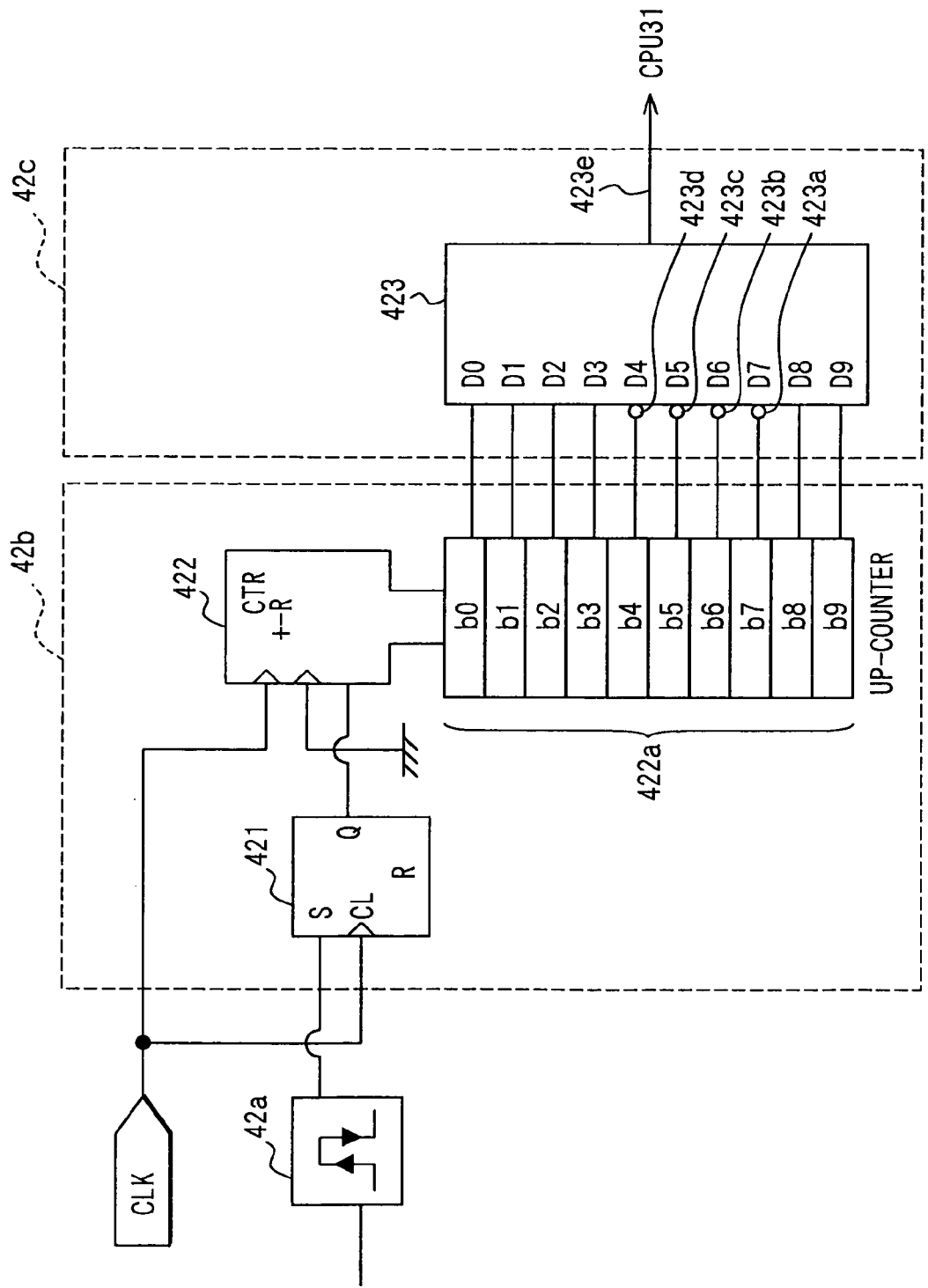
FIG. 4 is a block diagram illustrating a counter circuit and a comparator circuit.

As shown in FIG. 4, the abnormality detecting circuit 42 includes a trigger circuit 42*a*, a counter circuit 42*b*, a comparator circuit 42*c* and a signal line 42*d*. The abnormality detecting circuit 42 inputs the timing signal sent from the CPU 31 to the trigger circuit 42*a* that forms a trigger signal from a rising edge of a pulse when the timing signal changes from the L-level to the H-level or a falling edge of the pulse when the timing signal changes from the H-level to the L-level.

The counter circuit 42*b* is composed of a counter clearing circuit 421 and an up counter 422. The counter clearing circuit 421 is composed of an RS flip flop circuit, and the up counter 422 is a binary 10-bit free-run counter that is composed of a plurality of registers 422*a*. The registers 422*a* are respectively defined as b9, b8, . . . b0 from the highest bit register to the lowest bit register.

The counter circuit 42*b* usually counts the number of clock signals provided by a clock CLK to provide binary digit output signal. When the binary digit output signal becomes a maximum or overflows, the counter circuit 42*b* is reset to count the clock signals from 0. When the counter circuit 42*b* receives a trigger signal of the trigger circuit 42*a*, the output signal of the counter circuit 42*b* is reset or cleared to 0 to start counting again.

The comparator circuit 42*c* examines whether the counted number of the counter circuit 42*b* exceeds a threshold value or not. If the counted number exceeds the threshold value, it is presumed that the timing signal is not sent from the CPU 31. In this case, the comparator circuit 42*c* sends an H-level signal to the CPU 31, which sends a command signal via the signal line 42*d* to the sample-hold section 412 to hold the timing signal unchanged and the switch 41*c* in the turn-off state. Incidentally, the H-level signal of the comparator circuit 42*c* can be sent to the sample-hold section 412 to hold the switching operation via a signal line instead of the signal line 42*d*. On the other hand, if the counted number does not exceed the threshold value, it is presumed that the timing signal is normally sent from the CPU 31. In this case, the comparator circuit 42*c* sends an L-level signal to the CPU 31. The above-described structure is also useful when the signal line 42*d* comes down.

The comparator circuit 42*c* is composed of an AND circuit 423 that has a plurality of input terminals D0, D1 . . . D9, which are respectively connected to the output terminals of the registers b0, b1, . . . b9. An inverter circuit 423*a*, is connected between the register defined b7 and the terminal D7. Other inverter circuits 423*b*, 423*c*, 423*d* are respectively connected between the corresponding registers defined b6, b5, b4 and the terminals D6, D5, D4 in the same manner as the inverter circuit 423*a*. The AND circuit 423 is composed of a well-known logical circuit that provides an H-level (or 1) signal when an H-level (or 1) signal is sent to all the input terminals D0–D9. That is if the counted number in binary code becomes 1100001111, the H-level signal is provided from the output terminal 423*e* of the comparator 42*c*. Incidentally, if only one of the registers 422*a* becomes 1 when an abnormality is detected, such as 0010000000, the AND circuit 423 can be omitted if the output terminal of the register defined as b7 is directly connected to the CPU 31.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A motor-driven power steering system comprising:
   a power assisting motor;
   means for detecting motor current value;
   means for sampling and holding the detected motor current value at prescribed time intervals;
   means for generating a timing signal to activate the means for sampling and holding to continuously hold the detected motor current; and
   means for generating an abnormality signal if the timing signal is not detected for a prescribed period.

2. The motor-driven power steering system as claimed in claim 1, wherein the means for sampling and holding is activated if the timing signal is not detected for the prescribed period.

3. The motor-driven power steering system as claimed in claim 2, further comprising means for calculating command current value to be supplied to the power assisting motor, wherein the maximum of the command current value is set to the detected motor current value if the timing signal is not detected for the prescribed period.

4. The motor driven power steering system as claimed in claim 3, further comprising means for gradually decreasing the command current value.

5. A motor-driven power steering system comprising:
   a power assisting motor;
   a current sensor that detects motor current value; a timing signal generating circuit that generates bi-level timing signals at prescribed intervals;
   a sample-hold circuit for sampling and holding the detected motor current value at the prescribed time intervals set by said timing signal generating circuit; and
   an abnormality detecting circuit that makes said sample-hold circuit keep holding the last sampled value if the timing signal is not detected for a prescribed period.

6. The motor-driven power steering system as claimed in claim 5, wherein:
   said abnormality detecting circuit comprises a counter circuit connected to said timing signal generating circuit; and
   the prescribed period is generated when said counter circuit counts a prescribed number.

7. The motor-driven power steering system as claimed in claim 6, further comprising a torque sensor that detects steering torque and an assist current calculating circuit that calculates a command current value to be applied to said motor from both the current value sent from the sample-hold circuit and the steering torque sent from the torque sensor to control the motor, wherein the maximum of the command current value is set to the detected motor current value if the timing signal is not detected for the prescribed period.

8. The motor driven power steering system as claimed in claim 7, further comprising means for gradually lowering the command current value.

9. The motor driven power steering system as claimed in claim 1, wherein said means for generating a timing signal comprises a microcomputer.

10. The motor driven power steering system as claimed in claim 9, wherein said means for generating an abnormality signal is disposed out of said microcomputer.

11. The motor driven power steering system as claimed in claim 5, wherein said timing signal generating circuit comprises a microcomputer.

12. The motor driven power steering system as claimed in claim 11, wherein said abnormality detecting circuit is disposed out of said microcomputer.

* * * * *